Patented Mar. 17, 1942

2,276,704

UNITED STATES PATENT OFFICE 2,276,704

THICKENING AGENT FOR PRINTING AND DISCHARGING PASTES

Alwin Schneevoigt and Julius Beck, Ludwigshafen-on-the-Rhine, Germany, assignors to General Aniline & Film Corporation, a corporation of Delaware No Drawing. Application October 4, 1939, Serial No. 297,816. In Germany October 1, 1938

4 Claims. (Cl. 8—70)

The present invention relates to cloth printing and discharging pastes and a process of producing sharp printing patterns.

We have found that the products (hereinafter referred to for the sake of brevity as wood glycolic acid ethers) obtainable by the action of monohalogenacetic acids or their salts on wood which has been pretreated with an alkali hydroxide according to British Patent No. 508,547 are eminently suitable as thickening agents for cloth printing and discharging compositions. The said wood glycolic acid ethers may be used alone or in admixture with known thickening agents, as for example wheat starch. The new thickening agents are very cheap and are not only capable of replacing the thickening agents, mainly of natural origin, hitherto used, but they even have considerable advantages as compared with the latter. For example, prints on cloth obtained with printing pastes containing a coloring agent, the new thickening agents and the commonly used printing ingredients are very sharp and very good levelled, and discharges on cloth dyed with a dischargeable dyestuff obtained with a discharging paste containing apart from the usual discharging agents the new thickening agents are very sharp and they remain still sharp after several washings.

The following examples will further illustrate how the said invention may be carried out in practice, but the invention is not restricted to these examples.

Example 1

75 grams of Indanthrene Blue GCD double paste fine (Schultz, Farbstofftabellen, 7th edition, No. 1234) are made into a paste with 700 grams of a from 10 to 15 per cent aqueous solution of a wood glycolic acid ether prepared according to British specification No. 508,547, 120 grams of potash, 80 grams of the sodium salt of hydroxymethane sulphinic acid and 80 grams of glycerine. The whole mass is made up to 1 kilogram with water or with another thickening agent.

The printing paste obtained is printed onto a fabric of vegetable fibers, as for example cotton or artificial silk, and the fabric is dried, steamed for 5 minutes in a Mather Platt rapid steamer, rinsed, treated with a boiling soap solution, rinsed and dried. In this way there is obtained a vivid blue shade of excellent fastness to washing, light and rubbing. The said thickening may also be mixed in any proportions with any other alkali-stable thickening agent, such as starch or British gum.

Example 2

100 grams of Indanthrene Brilliant Green B paste fine concentrated (ibid., No. 1269) are made into a paste with 900 grams of a from 10 to 15 per cent aqueous solution of a wood glycolic acid ether prepared according to British specification No. 508,547 and the resulting paste is printed onto a fabric of vegetable fibers, as for example cotton or artificial silk. After printing, the dry fabric is led through a bath of caustic soda and hydrosulphite, steamed, rinsed, treated with a boiling soap solution, again rinsed and dried. A vivid green shade of good fastness to washing, light and rubbing is thus obtained.

Example 3

20 grams of the sodium salt of the leuco sulphuric acid ester of 5.5'.7.7'-tetrabromindigo are made into a paste of 750 grams of a thickening composed of 100 grams of wheat starch and 60 grams of a wood glycolic acid ether prepared according to British specification No. 508,547. To the paste are then added 50 grams of a 50 per cent ammonium thiocyanate solution, 50 grams of a 33 per cent sodium chlorate solution, 10 grams of a 1 per cent ammonium vanadate solution and 10 grams of 25 per cent aqueous ammonia and the whole is made up to 1 kilogram with water. The paste is printed onto a fabric of vegetable or animal fibers, as for example cotton, artificial silk, wool or silk, the printed fabric steamed for 5 minutes in a Mather Platt rapid steamer, rinsed, soaped, rinsed and dried. Deep dark blue prints are thus obtained.

Leuco-sulphuric acid esters of other vat dyestuffs may be printed in a similar manner.

Example 4

A solution of 30 grams of the azo dyestuff prepared from diazotized para-aminobenzoyl-ethyl-alpha-naphthylamine coupled with 1-benzoylamino - 8 - hydroxynaphthalene - 4.6 - disulphonic acid, in a mixture of 60 grams of alcohol and 130 grams of water, is stirred into 700 grams of a from 10 to 15 per cent aqueous solution of a wood glycolic acid ether prepared according to British specification No. 508,547, 30 grams of ammonium oxalate and 50 grams of a 70 per cent aqueous solution of glycolic acid are then added to the mixture. The resulting paste is printed onto a woollen or silk fabric, dried, steamed for 1 hour in a round steamer, rinsed, weakly soaped, rinsed again and dried. Vivid red prints are thus obtained on the said fabrics.

Other acid dyestuffs may be printed on animal fibers in a similar manner.

*Example 5*

A thickening consisting of a from 10 to 15 per cent solution of a wood glycolic acid ether prepared according to British specification No. 508,547 and 120 grams of the sodium salt of hydroxymethane sulphinic acid is printed onto a material dyed with a dischargeable dyestuff and dried. The printed fabric is then steamed in a Mather Platt rapid steamer, rinsed and finished off in the usual manner. A completely white discharge on a colored ground is thus obtained.

What we claim is:

1. A composition of matter for producing patterns and designs on cloth, selected from the group consisting of printing and discharging pastes which contain as a thickening agent a product obtained by the action of a mono-halogen acetic acid on wood, which has been pretreated with an alkali metal hydroxide.

2. A composition of matter for producing discharges on cloth dyed with a dischargeable dyestuff containing as a thickening agent a product obtained by the action of a mono-halogen acetic acid on wood, which has been pretreated with an alkali metal hydroxide.

3. A composition of matter for producing patterns and designs on cloth, which comprises a vat dyestuff printing paste containing as a thickening agent the product obtained by the action of a mono-halogen acetic acid on wood, which has been pretreated with an alkali metal hydroxide.

4. A composition of matter for producing patterns and designs on cloth, which comprises a sulfuric acid ester of a leuco vat dyestuff printing paste containing as a thickening agent a product obtained by the action of a mono-halogen acetic acid on wood, which has been pretreated with an alkali metal hydroxide.

ALWIN SCHNEEVOIGT.
JULIUS BECK.